(12) United States Patent
Belloso

(10) Patent No.: US 8,561,744 B1
(45) Date of Patent: Oct. 22, 2013

(54) VEHICLE WITH MULTIPLE ENGINES COUPLED TO A TRANSMISSION VIA A JACKSHAFT

(76) Inventor: Gregorio M. Belloso, Salisbury, MD (US)

(*) Notice: Subject to any disclaimer, the term of this patent is extended or adjusted under 35 U.S.C. 154(b) by 232 days.

(21) Appl. No.: 13/068,332

(22) Filed: May 10, 2011

Related U.S. Application Data

(63) Continuation-in-part of application No. 12/152,943, filed on May 20, 2008, now abandoned.

(51) Int. Cl.
*B60K 5/08* (2006.01)
*B60W 10/06* (2006.01)

(52) U.S. Cl.
CPC .................................. *B60W 10/06* (2013.01)
USPC ....................................................... 180/69.6

(58) Field of Classification Search
CPC .......... F02B 73/00; B60K 5/08; B60K 6/442; B60K 6/46; B60K 6/543
USPC ........ 180/69.6, 291, 294, 298, 65.22, 65.245, 180/65.25, 65.26
See application file for complete search history.

(56) References Cited

U.S. PATENT DOCUMENTS

| | | | | |
|---|---|---|---|---|
| 845,850 A | * | 3/1907 | Carter | 180/69.6 |
| 2,366,646 A | * | 1/1945 | Orr | 475/8 |
| 2,419,929 A | * | 4/1947 | Wilcox | 180/69.6 |
| 2,443,720 A | * | 6/1948 | Burrus | 74/661 |
| 3,194,087 A | * | 7/1965 | Kronogard | 74/661 |
| 4,392,393 A | * | 7/1983 | Montgomery | 74/661 |
| 4,421,217 A | * | 12/1983 | Vagias | 477/6 |
| 4,481,841 A | * | 11/1984 | Abthoff et al. | 74/661 |
| 4,566,279 A | * | 1/1986 | Kronogard et al. | 60/718 |
| 6,852,062 B1 | * | 2/2005 | Ahner et al. | 477/2 |
| 7,416,510 B2 | * | 8/2008 | Gebby | 477/2 |

* cited by examiner

*Primary Examiner* — John R Olszewski
*Assistant Examiner* — Brian Cassidy
(74) *Attorney, Agent, or Firm* — Norman B. Rainer

(57) ABSTRACT

A motor vehicle is provided with a power train having primary and auxiliary internal combustion engines which selectively feed power to a jackshaft. The power accumulated in the jackshaft is conveyed to a speed change transmission. Fuel economy is achieved by utilizing only one engine when lesser power is needed by the vehicle.

8 Claims, 4 Drawing Sheets

VEHICLE WITH MULTIPLE ENGINES COUPLED TO A TRANSMISSION VIA A JACKSHAFT

PRIOR APPLICATIONS

This application is a Continuation-In-Part of application Ser. No. 12/152,943, filed May 20, 2008 now abandoned.

BACKGROUND OF THE INVENTION

1. Field of the Invention

This invention relates to a vehicle having multiple internal combustion engines whose power output can be combined and routed to a transmission for the purpose of improving fuel efficiency and accommodating the power needs of the vehicle.

2. Description of the Prior Art

Increasing greenhouse gas emissions to the atmosphere and the escalating cost of fossil fuels have spurred the search for means to improve automotive fuel efficiency. One solution has been the hybrid automobile which uses a small fuel-efficient internal combustion engine augmented by a battery-driven electric motor to power the vehicle. Another solution employs two or more internal combustion engines, using their combined power for acceleration, climbing steep grades, etc., and using the power of one engine to cruise economically.

The present invention relates to the latter solution, using two engines for acceleration, and one engine to cruise.

Prior dual engine systems have encountered difficulties involving the smooth and efficient interaction of the engines, and the routing of controlling amounts of fuel to the engines. For example, U.S. Pat. No. 4,421,217 to Vagias discloses a vehicle propulsion system involving a small engine employed to propel the vehicle economically in a cruising mode, and a large engine intended to add additional power when needed by the vehicle for acceleration, hill climbing or other power demands. In operation, the small engine, when in a situation where it is struggling to maintain propulsion of the vehicle, is automatically caused to start up the large engine. The start up procedure employs a clutch which unifies the crankshafts of both engines. Such procedure engenders stall-out of the small engine. Also, the integrated crank shafts are unlikely to produce a smooth combined effect because of differences in centrifugal balances and timing factors. Vagias' large engine cannot run independently because it must act through the small engine in order to transmit power to the transmission. This complicates the equitable supply of fuel to either the small engine alone or the integrated engines where both crankshafts rotate in unison.

Japanese Patent JP358026635A to Sakazaki discloses a vehicle having separate engines to drive the wheels of front and rear axles. Operator-manipulated individual accelerator pedals enable the operator to activate either or both engines. However, separate speed-change transmissions must be associated with each engine, thereby contributing to the cost and weight of the vehicle.

U.S. Pat. No. 6,637,283 to Belloso concerns a control apparatus for a continuously variable transmission, and is capable of accommodating two different power input sources. However, this is not commercially available, and said two power input sources must be received from opposite directions.

Accordingly, it is an object of this invention to provide a vehicle equipped with two engines for the purpose of achieving improved fuel efficiency through the use of a speed change transmission of commonplace design.

It is another object of the present invention to provide a vehicle of the aforesaid nature wherein the speed of each engine is separately controllable, and the output powers of said engines can be accumulated and fed to a speed change transmission.

It is another object of this invention to provide a vehicle of the aforesaid nature wherein the speed of each engine is controlled by adjustable supply of fuel to each engine.

These objects and other objects and advantages of the invention will be apparent from the following description.

SUMMARY OF THE INVENTION

The above and other beneficial objects and advantages are accomplished in accordance with the present invention by a motor vehicle having a chassis elongated upon a center axis between paired front and paired rear wheels, and a power train comprised of:

a) primary and auxiliary internal combustion engines located one in front of the other adjacent said front wheels, each engine having a power output shaft extending in parallel juxtaposition with said center axis and both having the same direction of rotary motion, b) separate fuel supply means for each engine, c) releasable coupling and power transfer means associated with each output shaft, d) a speed change transmission positioned rearwardly of said engines and having an input shaft, and e) a jackshaft laterally spaced from said engines in parallel relationship to said center axis, and rotatably secured by said chassis to selectively receive and accumulate power from said engine output shafts and convey said accumulated power to the input shaft of said speed change transmission, whereby f) economy of operation is achieved by deactivating one engine when lesser power is needed for propulsion of the vehicle.

Said releasable coupling and power transfer means may be a movable sheave torque converter unit (CVT) that produces continuously variable output rotational speeds, or may be a fluid torque converter. Still other specific embodiments of the releasable coupling and power transfer means include releasible automatic or manually activated clutches such as a centrifugal clutch, electromagnetic power clutch, cone clutch and friction plate clutch.

Said jackshaft may be divided into sections, each section being interactive with a separate engine, with each section releasibly coupled to the next contiguous section byway of a suitable coupling means such as a free wheeling clutch such as a sprag clutch. Such construction serves to ensure more complete decoupling of one engine from the other during low power operations such as when traveling at substantially constant cruising speeds on a highway.

The primary engine may be made to have about ½ to ⅓ the size and power capacity of the auxiliary engine to maximize fuel economy while cruising with minimum load, and to maximize performance in acceleration and other heavy duty capacity. Furthermore, each engine may be coupled to the jackshaft via a free-wheeling clutch, such as a sprag clutch, so that it becomes possible to choose to power the vehicle with only the primary engine for light duty operation (e.g., for cruising with minimum load), or with only the auxiliary engine for medium duty operation (e.g., for cruising when fully loaded), and with power from both the primary engine and the auxiliary engine for maximal acceleration or heavy duty operation.

In general, an internal combustion engine is most fuel-efficient when it is operated at about 60% to 90% of its rated capacity. It is generally less fuel-efficient when operated outside this range. Furthermore, an automobile weighing about 3000 lbs may need only about 30 horsepower (HP) to maintain cruising speed on the highway, but may need about 120 HP to accelerate within an acceptably short time to keep up with traffic. In a conventional automobile equipped with only one engine, this vehicle would have to be equipped with an engine having a rated capacity of at least 120 HP, yet when it is operated to produce only 30 HP for cruising it would be operating at only 25% of its rated capacity which is too far below the 60% to 90% range of its rated capacity for it to be fuel-efficient. It would be preferable, from the fuel efficiency standpoint, for the vehicle to be powered by a 40 HP engine for cruising, since this engine would then be operating at 75% of its rated capacity, i.e. at the middle of its most fuel efficient range.

To permit selective use of either the primary engine or the auxiliary engine, or both, the fuel supply of each engine may be controlled through a separate gas pedal for each engine. Said gas pedals may be most conveniently operated by the operator's right foot if they are placed next to each other in the usual location of the gas pedal, with their size and position being adjusted so that either pedal may be independently depressed to control the operation of either engine, or both may be depressed together by the right foot to operate both engines at the same time.

Alternatively, load sensors associated with the power train may be used to send input data to a vehicle's power management computer to regulate selective use of either or both engines, as needed, to suit operating conditions.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

For clarity of illustration, details which are not relevant to the invention, such as engine mounts, transmission mounts, undercarriage of the vehicle, and internal parts of the transmission and differential, etc., have been omitted from the aforesaid drawings. Furthermore/details of the internal parts of CVT torque converters and sprag clutches, which are well known in the art and readily available in the standard texts on the subjects, are likewise omitted from the aforesaid drawings.

DESCRIPTION OF THE PREFERRED EMBODIMENT

Figure 1:
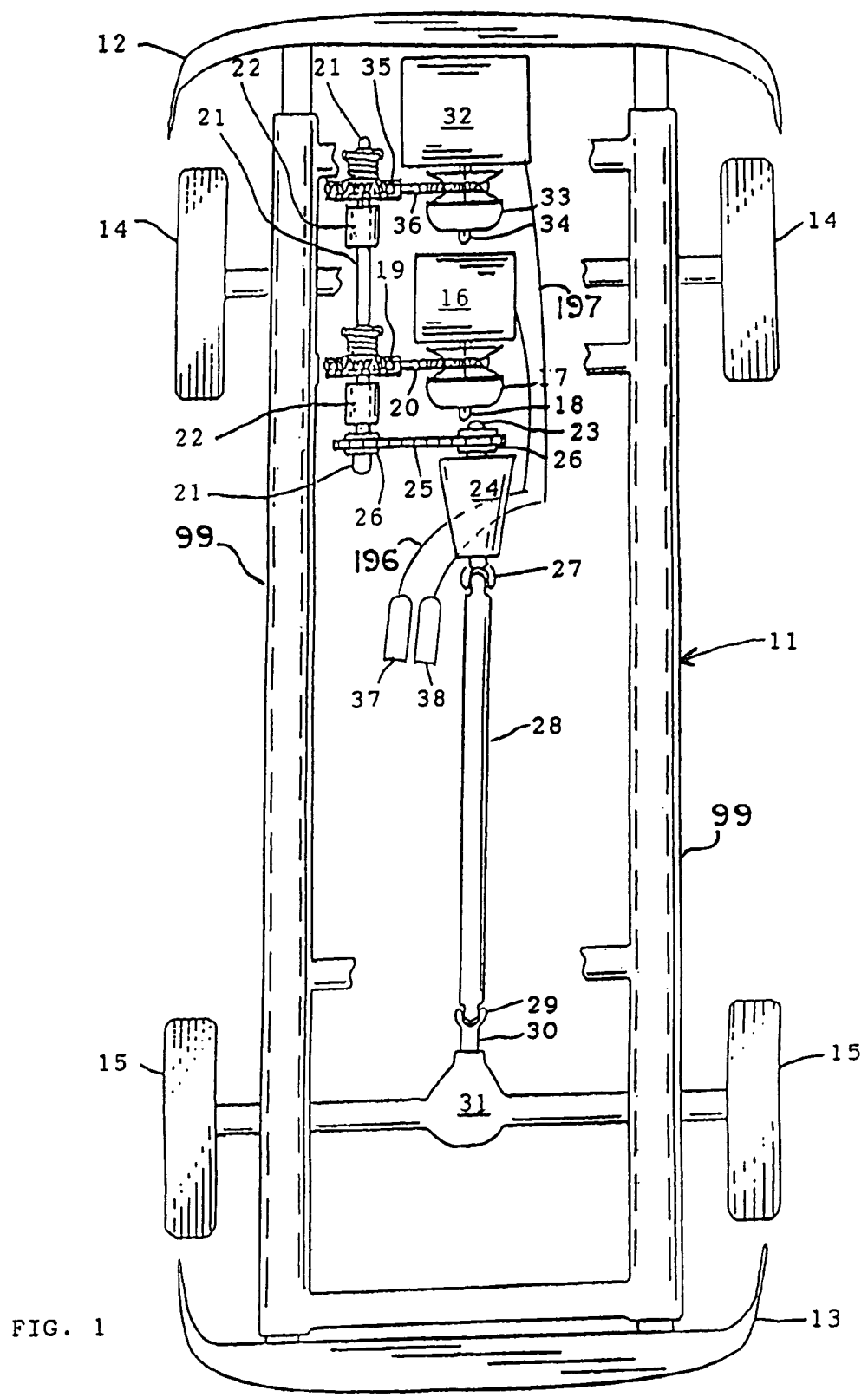
FIG. 1 is a schematic top view of an embodiment of the vehicle of the present invention.

Referring now to the drawings wherein one character designates one feature of the invention, FIG. 1 shows a vehicle of the present invention having a chassis 11 connected to front bumper 12 and rear bumper 13 by intervening elongated side portions 99, and supported by paired front wheels 14 and paired rear wheels 15.

A power train is shown comprised of primary "cruiser" engine 16 mounted on chassis 11. Primary CVT driver pulley 17 is mounted on output shaft 18 of said primary engine, and is connected to primary CVT driven pulley 19 by drive belt 20. Driven pulley 19 is fixedly mounted on jackshaft 21 which is rotatably journaled on bearings 22 anchored on side portion 99 of chassis 11. Jackshaft 21 is connected to input shaft 23 of speed change transmission 24 via chain 25 and sprockets 26. Power from speed change transmission 24 is conveyed via front universal joint 27, propeller shaft 28, rear universal joint 29, pinion 30, and differential 31 to the rear wheels 15 to drive the vehicle.

The size and power capacity of primary engine 16 is designed to be sufficient to keep the vehicle at cruising speed on a fairly level highway, but small enough so that it can maintain said cruising speed in the most fuel-efficient manner.

For heavy duty operation, such as for acceleration, towing, carrying heavy load, or climbing a steep grade, the vehicle is equipped with an auxiliary engine 32 whose size and power capacity is designed so that, when it is operated together with primary engine 16, their combined power will be sufficient to power the vehicle during said heavy duty operations.

Auxiliary CVT drive pulley 33 is mounted on the output shaft 34 of auxiliary engine 32 and is connected to auxiliary driven pulley 35 by auxiliary drive belt 36. Auxiliary driven pulley 35 is fixedly mounted on jackshaft 21 so that when both primary engine 16 and auxiliary engine 32 are operated at the same time, their combined power is conveyed by jackshaft 21 to speed change transmission 24 thence to said rear wheels. The two engines 16 and 32 are operated together for acceleration and other heavy duty operations. After the vehicle reaches cruising speed, auxiliary engine 32 is throttled down to idle speed or stopped to conserve fuel, and the vehicle is maintained at cruising speed by power from primary engine 16 alone.

The CVT torque converter, comprised of drive pulley 33, drive belt 36 and driven pulley 35, automatically becomes disengaged when auxiliary engine 32 runs below a minimum "engagement speed" such as when it is stopped or run at idle speed. Accordingly, when the vehicle is traveling at cruising speed, the slowed or stopped auxiliary engine 32 is automatically disengaged from the rest of the power train so that it will not exert a drag on primary engine 16. If engine 32 runs at idle speed, its power is readily available when needed by simply increasing its fuel supply. If it is stopped, means for it to be quickly restarted to provide auxiliary power may be provided, in a manner similar to current hybrid vehicles.

Gas pedal 37 regulates fuel supply to primary engine 16 through fuel line 196, and gas pedal 38 regulates fuel supply to auxiliary engine 32 through fuel line 197. The driver, therefore, is able to selectively operate either engine 16 or engine 32 by selectively depressing its corresponding gas pedal, 37 or 38. To operate both engines 16 and 32 at the same time, he simply depresses both pedals simultaneously.

Figure 2:
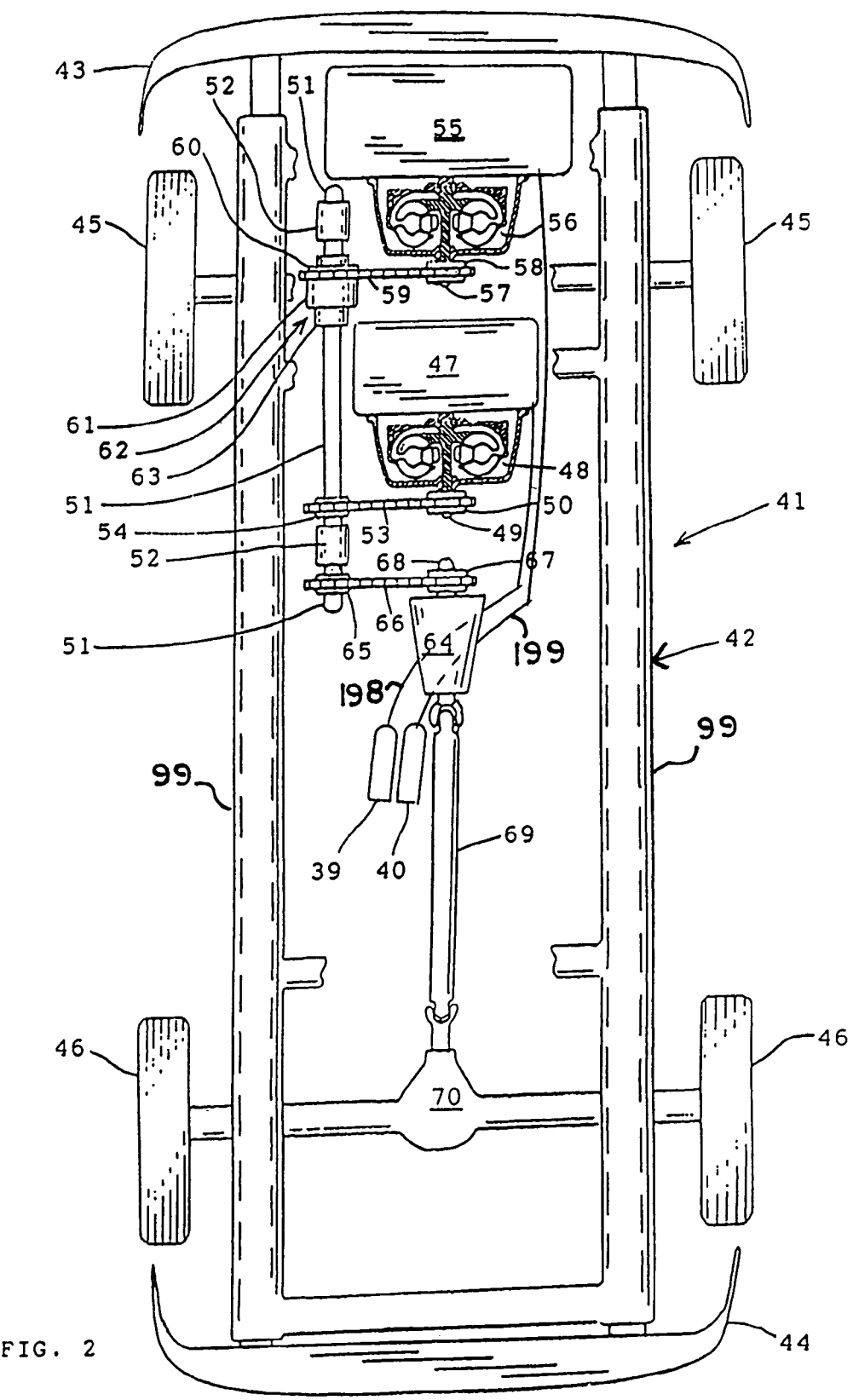
FIG. 2 is a schematic top view of a first alternative embodiment of the vehicle of the present invention.

FIG. 2 shows a first alternative embodiment of the vehicle 41 having a chassis 42, front bumper 43, rear bumper 44, front wheels 45 and rear wheels 46. Primary engine 47 is coupled to a fluid torque converter 48 on whose output shaft 49 is mounted drive sprocket 50. Jackshaft 51 is mounted alongside primary engine 47 rotatably journaled on bearings 52 which are anchored on chassis 42. Power from primary engine 47 is transmitted to jackshaft 51 via torque converter

48, drive sprocket 50, endless chain 53 and driven sprocket 54 which is fixedly mounted on jackshaft 51.

The size and power capacity of primary engine 47 is selected to be sufficient to maintain the vehicle 41 at cruising speed, and yet be small enough to perform such function in the most fuel-efficient manner.

Auxiliary engine 55 is installed in vehicle 41 to provide additional power such as for acceleration and hill climbing. Auxiliary engine 55 is coupled to auxiliary fluid torque converter 56 on whose output shaft 57 is mounted auxiliary drive sprocket 58 which is connected by endless chain 59 to driven sprocket 60 which is fixedly attached to the outer race 61 of sprag clutch 62 whose inner race 63 is fixedly mounted on jackshaft 51. Jackshaft 51 is connected to speed change transmission 64 via jackshaft drive sprocket 65, endless chain 66 and driven sprocket 67 which is mounted on input shaft 68 of transmission 64.

The power capacity and size of auxiliary engine 55 is selected so that its power output, when combined with the power output of primary engine 47 will be sufficient to give the vehicle 41 satisfactory performance in acceleration, climbing a grade and other heavy duty operations in which the vehicle is expected to be used.

To operate the vehicle, primary engine 47 and auxiliary engine 55 are started and speeded up. Power from primary engine 47 is conveyed via fluid torque converter 48, thence through chain 53 and sprockets 50 and 54 to jackshaft 51, thence via chain 66 and sprockets 65 and 67 to speed change transmission 64 which is shifted to "drive" thereby transmitting power to propeller shaft 69 and differential 70 to drive wheels 46. Additional power from auxiliary engine 55 is conveyed via auxiliary fluid torque converter 56 through chain 59 and sprockets 58 and 60 thence via sprag clutch 62 and jackshaft 51 to chain 66, sprockets 65 and 67 and transmission 64 to supply additional power to the wheels 46.

After the vehicle 41 reaches cruising speed, auxiliary engine 55 is throttled down to idle speed or stopped altogether to conserve fuel. When auxiliary engine 55 is slowed down or stopped, sprag clutch 62 disengages outer race 61 automatically from inner race 63 thereby decoupling the auxiliary engine 55 completely from jackshaft 51 and preventing the auxiliary engine 55 from exerting a drag force on the vehicle. Vehicle 41 then continues to travel, fuel-efficiently, on power from primary engine 47 alone.

Whenever additional power is again needed, the operator simply feeds more fuel to auxiliary engine 55, speeding it up, which will cause sprag clutch 62 to be automatically engaged, thereby transmitting the additional power to jackshaft 51 to help power the vehicle.

FIG. 2 shows auxiliary engine 55 to be substantially larger than primary engine 47. This is to illustrate that for the purpose of maximizing fuel economy it may be advantageous to downsize the cruiser engine (in this case, primary engine 47) to about one-fourth of the total power capacity available to the vehicle. The literature suggests that the average automobile is able to cruise comfortably, on a relatively level highway, using as little as about 25 to 35 horsepower which is approximately one-fourth of the power output of the engine of an average automobile. Conversely, for maximal performance, the power of the auxiliary engine may be selected to be two to four times that of the primary engine.

Gas pedal 39 regulates fuel supply to primary engine 47 via fuel line 198 and gas pedal 40 regulates fuel supply to auxiliary engine 55 via fuel line 199. The operator, therefore, is able to selectively operate either engine 47 or engine 55 by depressing corresponding gas pedals 39 or 40, respectively. To operate both engines at the same time, he simply depresses both pedals simultaneously with one foot, which is easily done since the pedals are located side by side.

Figure 3:
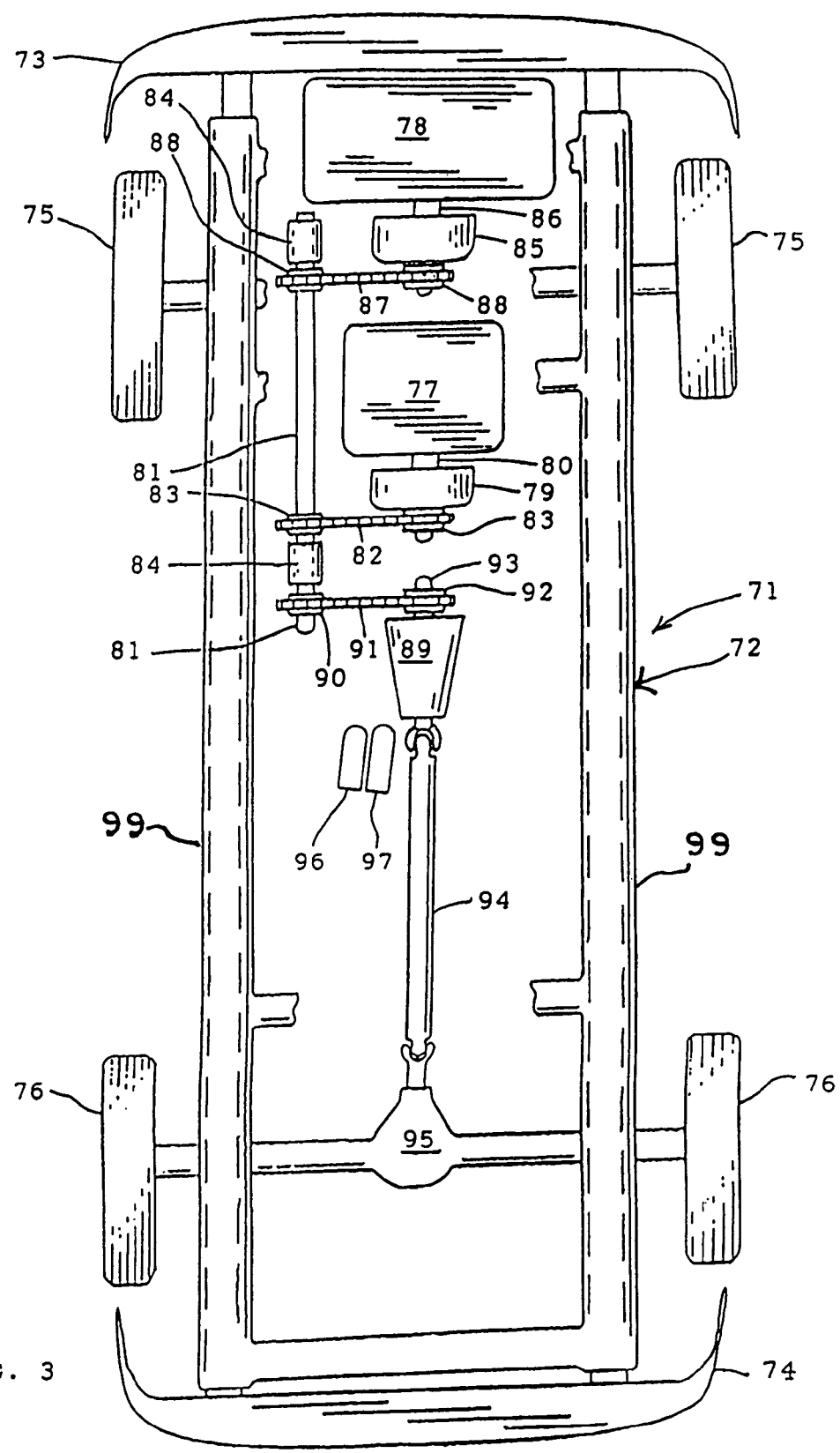
FIG. 3 is a schematic top view of a second alternative embodiment of the vehicle of the present invention.

A second alternative embodiment, illustrated in FIG. 3, shows a vehicle 71 having a chassis 72, front bumper 73, rear bumper 74, front wheels 75, rear wheels 76, primary engine 77 and auxiliary engine 78. A centrifugal clutch 79 is mounted on the output shaft 80 of primary engine 77 and is coupled to jackshaft 81 by endless chain 82 and sprockets 83. Jackshaft 81 is rotatably mounted on bearings 84. Auxiliary centrifugal clutch 85 is mounted on the output shaft 86 of auxiliary engine 78, and is connected to jackshaft 81 by endless chain 87 and sprockets 88.

To operate the vehicle 71, primary engine 77 and auxiliary engine 78 are started and speeded up. Centrifugal clutch 79 has a preset "engagement speed" and, when the rotational speed of output shaft 80 exceeds the engagement speed, centrifugal clutch 79 automatically engages and transmits power to jackshaft 81 via endless chain 82 and sprockets 83. Similarly, auxiliary centrifugal clutch 85 has a preset engagement speed, and when the rotational speed of output shaft 86 exceeds this engagement speed the centrifugal clutch 85 automatically engages and transmits power to jackshaft 81 via endless chain 87 and sprockets 88. Jackshaft 81 then transmits this combined power of the two engines 77 and 78 to transmission 89 via jackshaft sprocket 90, endless chain 91 and transmission sprocket 92 which is mounted on transmission input shaft 93. Power from transmission 89 is then conveyed through propeller shaft 94 and differential 95 to drive wheels 76 to propel the vehicle 71.

When vehicle 71 reaches cruising speed, auxiliary engine 78 is slowed down to idle speed (or stopped altogether) to conserve fuel. When the rotational speed of output shaft 86 falls below the engagement speed of centrifugal clutch 85, centrifugal clutch 85 automatically disengages so that auxiliary engine 78 will not exert any drag on the vehicle. Vehicle 71 then continues traveling economically on power from primary engine 77 alone.

When additional power is needed such as for accelerating to pass another vehicle, or to climb a grade, auxiliary engine 78 is simply speeded up to be re-engaged automatically via centrifugal clutch 85, or, if it had been stopped, it is then restarted and speeded up to supply additional power as needed.

Although a centrifugal clutch is shown in this embodiment, other types of clutches can be used, such as an electromagnetic clutch, friction clutch, or toroidal torque converter.

Gas pedal 96 regulates fuel supply to primary engine 77, and gas pedal 97 regulates fuel supply to auxiliary engine 78. The operator, therefore, may selectively operate either engine 77 or engine 78 by selectively depressing its corresponding gas pedal, 96 or 97. To operate both engines at the same time he simply depresses both pedals simultaneously.

Figure 4:
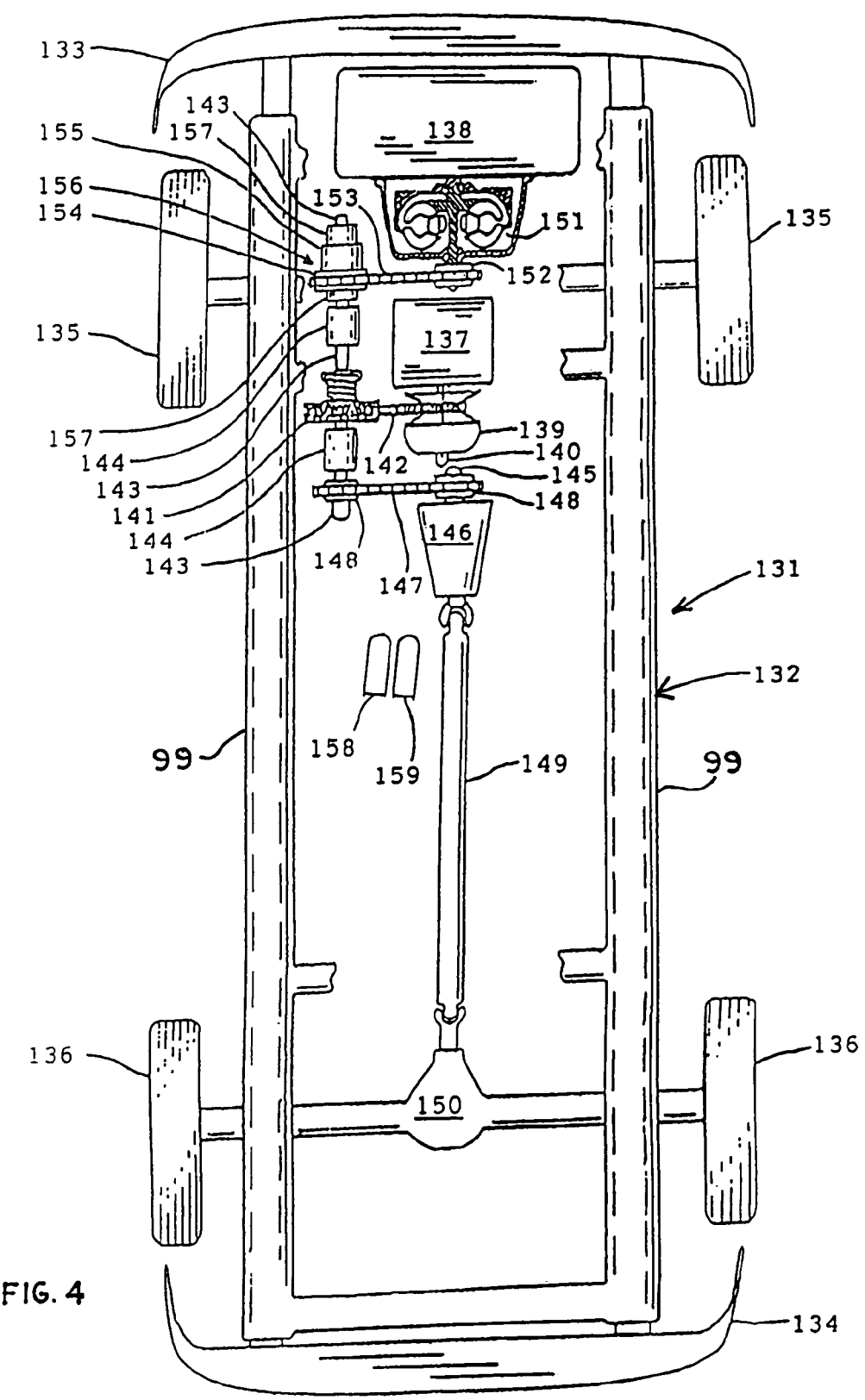
FIG. 4 is a schematic top view of a third alternative embodiment of the vehicle of the present invention.

FIG. 4 shows how additional alternative embodiments may be made by combining certain features of any of the foregoing embodiments with selected features of another. The embodiment shown in FIG. 4 comprises a vehicle 131 having a chassis 132, front bumper 133, rear bumper 134, front wheels 135, rear wheels 136, primary engine 137 and auxiliary engine 138. CVT drive pulley 139 is mounted on output shaft 140 of primary engine 137 and is connected to CVT driven pulley 141 by drive belt 142. CVT driven pulley 141 is mounted on jackshaft 143 comprised of two halves coupled by speed activated clutch 144. Jackshaft 143 is connected to input shaft 145 of speed change transmission 146 via endless chain 147 and sprockets 148. Power from speed change transmission 146 is conveyed to rear wheels 136 via propeller shaft 149 and differential 150.

Auxiliary engine 138 is coupled to fluid torque converter 151 via torque converter sprocket 152, endless chain 153 and sprag clutch sprocket 154 which is fixedly mounted on the outer race 155 of sprag clutch 156 whose inner race 157 is fixedly mounted on jackshaft 143. Sprag clutch 156 is a freewheeling clutch whose outer race 155 automatically engages (and drives) the inner race 157 whenever the rate of rotation of the outer race 155 exceeds that of inner race 157, and automatically disengages when the rate of rotation of outer race 155 is less than that of inner race 157.

To operate vehicle 131, primary engine 137 and auxiliary engine 138 are started and speeded up. When the rate of rotation of primary engine output shaft 140 exceeds the engagement speed of CVT drive pulley 139, drive pulley 139 engages and drives driven pulley 141 via drive belt 142 which turns jackshaft 143. Power from auxiliary engine 138 is conveyed to said jackshaft via torque converter 151, sprocket 152, endless chain 153, sprag clutch sprocket 154 and sprag clutch outer race 155 which causes sprag clutch 156 to engage and cause inner race 157 to turn jackshaft 143, thus combining the power of auxiliary engine 138 with that of primary engine 137 to turn said jackshaft.

Power from jackshaft 143 is then conveyed to speed change transmission 146 via endless chain 147 and sprockets 148, and the power is in turn transmitted via transmission 146, propeller shaft 149, and differential 150 to rear wheels 136 to drive the vehicle 131. After the vehicle 131 reaches cruising speed, the auxiliary engine may be throttled down to idle speed or stopped altogether to conserve fuel. When the speed of auxiliary engine 138 falls below that of primary engine 137, sprag clutch 156 automatically disengages so that neither auxiliary engine 138 or associated torque converter 151 can exert drag on jackshaft 143. The vehicle 131 will then continue to travel fuel-efficiently on power from primary engine 137 alone.

Fuel supply to primary engine 137 is regulated through gas pedal 158, and fuel supply to auxiliary engine 138 is regulated through gas pedal 159 which is located alongside gas pedal 158 so that the operator may conveniently depress either pedal singly or depress both pedals at the same time with one foot. He may then easily elect to operate both engines for maximal power, or operate only said primary engine for maximal fuel economy. It should be noted that whenever primary engine 137 slows down below the engagement speed of CVT drive pulley 139, the associated CVT torque converter automatically disengages.

Other embodiments of the invention may be made by using different combinations of clutches and torque converters to connect the primary and the auxiliary engines to the jackshaft, such as by using an electromagnetic power clutch or a centrifugal clutch to connect either engine to the jackshaft in combination with a CVT torque converter or a fluid torque converter for the other engine, or even the combination of an electric generator with associated electric motor.

Although preferred embodiments are described in detail, it is to be understood that various changes and modifications may be made therein without departing from the scope of the invention as described in the appended claims.

Having thus described my invention, what is claimed is:

1. A motor vehicle having a chassis elongated upon a center axis between paired side portions, paired front wheels and paired rear wheels which drive the vehicle, and a power train comprised of:
   a) primary and auxiliary gasoline-operated internal combustion engines located one in front of the other with respect to said axis adjacent said front wheels, each engine having a rearwardly directed power output shaft extending in parallel juxtaposition with said center axis and both having the same direction of rotary motion, said primary engine having ½ to ⅓ the horsepower of said auxiliary engine,
   b) releasible coupling and power transfer means associated with each output shaft, and having means for producing continuously variable rotational speeds,
   c) a speed change transmission positioned rearwardly of said engines and having an input shaft and interactive mechanical means for transferring power to said rear wheels, and
   d) a jackshaft laterally directly adjacent to said engines in parallel relationship to said center axis, and rotatably secured directly adjacent to one of said side portions to selectively receive and accumulate power from said engine output shafts and convey said accumulated power to the input shaft of said speed change transmission, whereby
   e) economy of operation is achieved by deactivating one engine when lesser power is needed for propulsion of the vehicle.

2. The vehicle of claim 1 wherein said releasable coupling and power transfer means comprises a movable sheave torque converter unit that produces continuously variable output rotational speeds.

3. The vehicle of claim 1 wherein said releasable coupling and power transfer means comprises a fluid torque converter.

4. The vehicle of claim 1 wherein said jackshaft is comprised of two sections in coaxial alignment, each section being interactive with a separate engine, said sections being releasibly coupled by speed activated clutch means.

5. The vehicle of claim 1 wherein the speed of operation of each engine is controlled by a separate supply of gasoline.

6. The vehicle of claim 5 wherein said separate supply of gasoline is provided by way of separate accelerator pedal means conventionally located near the vehicle operator.

7. The vehicle of claim 1 wherein said jackshaft selectively receives power from said engines by way of an intervening free-wheeling clutch.

8. The vehicle of claim 7 wherein said clutch is a sprag clutch.

* * * * *